United States Patent [19]

Gini et al.

[11] 4,303,738
[45] Dec. 1, 1981

[54] MAGNETIC MEDIA HAVING TRIDECYL STEARATE LUBRICANT

[75] Inventors: Donald Gini, Boulder; Theodore L. Larson, Longmont; Ronald A. Merten, Boulder, all of Colo.; Alex Simonetti, Tucson, Ariz.

[73] Assignee: International Business Machines Corporation, Armonk, N.Y.

[21] Appl. No.: 172,502

[22] Filed: Jul. 28, 1980

[51] Int. Cl.³ .............................................. B32B 27/40
[52] U.S. Cl. ............................. 428/423.1; 252/62.54; 428/695; 428/702; 428/900
[58] Field of Search ............................... 427/127–132, 427/48; 252/62.54; 428/900, 423.1, 695, 702

[56] References Cited

U.S. PATENT DOCUMENTS

| | | | |
|---|---|---|---|
| 2,654,681 | 10/1953 | Lueck | 117/161 |
| 2,775,566 | 12/1956 | Crowley | 260/19 |
| 2,804,401 | 8/1957 | Cousino | 117/138.8 |
| 2,954,552 | 9/1960 | Halpern | 343/18 |
| 2,989,415 | 6/1961 | Horton et al. | 117/31 |
| 3,029,157 | 4/1962 | Sutheim et al. | 117/36.1 |
| 3,139,354 | 6/1964 | Wolff | 117/121 |
| 3,274,111 | 9/1966 | Sada et al. | 252/62.5 |
| 3,387,993 | 6/1968 | Flowers | 117/121 |
| 3,492,235 | 1/1970 | Matsumoto et al. | 252/62.54 |
| 3,525,694 | 8/1970 | Bisschops et al. | 252/62.54 |
| 3,547,693 | 12/1970 | Huguenard | 117/235 |
| 3,630,772 | 12/1971 | Seidel | 117/235 |
| 3,649,541 | 3/1972 | Ingersoll | 252/62.54 |
| 3,704,152 | 11/1972 | Hartmann et al. | 117/235 |
| 3,833,412 | 9/1974 | Akashi et al. | 117/240 |
| 3,834,870 | 9/1974 | Tucker | 8/168 |
| 3,926,826 | 12/1975 | Graham et al. | 252/62.54 |
| 3,929,659 | 12/1975 | Graham | 252/62.54 |
| 3,987,232 | 10/1976 | Huguenard et al. | 428/539 |
| 4,152,469 | 5/1979 | Allen et al. | 427/129 |

OTHER PUBLICATIONS

*Chemical Abstracts*, 1976, vol. 84, p. 45992, 1965, vol. 62, p. 6650.

*Primary Examiner*—Bernard D. Pianalto
*Attorney, Agent, or Firm*—Francis A. Sirr

[57] ABSTRACT

Magnetic recording media highly loaded with magnetic oxide particles. This media possesses a very smooth surface finish, and in operation exhibits low media wear, as well as low wear of an associated transducing head. This media includes an internal lubricant tridecyl stearate; i.e. a linear, 31-carbon fatty acid ester molecule formed by the ester linking of 13-carbon tridecyl alcohol and 18-carbon stearic acid, the molecule having the composition

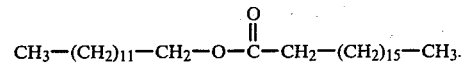

7 Claims, 2 Drawing Figures

MAGNETIC MEDIA HAVING TRIDECYL STEARATE LUBRICANT

TECHNICAL FIELD

The present invention relates to the field of magnetic recording media, and lubricants therefor.

BACKGROUND OF THE INVENTION

The use of lubricants to improve the performance of magnetic recording media, including the dispersion of lubricant in a mixture prior to application of the mixture to a non-magnetic support such as a synthetic resin film, is of course well known, as exemplified by the following.

In U.S. Pat. No. 2,989,415 magnetic recording media includes stearic acid.

U.S. Pat. No. 3,387,993 describes magnetic recording media whose lubricant constituent comprises a mineral lubricating oil and a fatty acid amide, including those amides corresponding to saturated or unsaturated fatty acids having from 6 to 18 carbon atoms. A mixture of 25 parts myristamide and 75 parts stearamide is described. Other suitable amides include caproic, caprylic, lauric, palmitic, mixture thereof, as well as myristic and stearic amides alone or in mixture.

In U.S. Pat. No. 3,492,235 the lubricant is a high molecular weight hydrocarbon containing from about 18 to about 30 carbon atoms, such as squalene, squalane, pristane, eicosane, mixtures thereof, and mixtures of the foregoing with ester lubricants selected from the group stearyl butyrate ester, stearyl stearate ester and stearyl laurate ester.

The use of a monobasic fatty acid having at least four carbon atoms and a melting point lower than 50° C. is described in U.S. Pat. No. 3,833,412. Such acids are said to include caprylic, capric, lauric, linolenic, linolic and oleic acid, with a specific example of stearic acid being given.

U.S. Pat. No. 3,926,826 suggests the use of a stearamide lubricant in magnetic media.

U.S. Pat. No. 3,987,232 suggests the use of a carbonic acid ester lubricant, generally 13 to 33 carbon atoms, in magnetic recording media, and particularly ethyl cetyl carbonate, ethyl laury carbonate, didodecyl carbonate or phenyl cetyl carbonate.

In U.S. Pat. No. 4,152,469 a lubricating film is topically applied to the magnetic film of magnetic recording media. This film is an organic compound such as silicone based chlorosilane, polyethylene, or a stearate such as polyoxyethylene monostearate, morpholino stearate, triethanolamine stearate and mixtures of such materials.

These lubricants have, more particularly, included stearate and fatty ester lubricants.

U.S. Pat. No. 3,274,111 describes magnetic recording media with a self-contained lubricant of a fatty acid ester, or mixture of fatty acid esters, which are mixed with gamma-iron oxide or iron-cobalt-nickel composition. Such solid lubricants are said to have a melting point up to about 40° C. These esters are produced by reaction between a pure monobasic fatty acid or a mixture of two or more monobasic fatty acids containing from about 12 to about 16 carbon atoms and a monohydroxy aliphatic alcohol with from about 3 to 12 carbon atoms. Examples are butyl laurate, an ester prepared from lauryl alcohol and a fatty acid mixture of palmitic acid, a mixture of propyl laurate and butyl myristate, and isobutyl myristate.

U.S. Pat. No. 3,547,693 is one in which magnetic tape incorporates monomeric vinyl stearate, allyl stearate, or other monomeric aliphatic esters of a long chained fatty acid and of an unsaturated alcohol as lubricant. The use of fatty acid esters prepared from a monobasic fatty acid having at least 18 carbon atoms is also recognized. Here the patentee states that the fatty acids should be monomeric, preferably those of stearic acid, such as allyl stearate, vinyl stearate, etc. It is said that the lubricating agent can be incorporated into the magnetic coating at any stage of the coating preparation, including application to the finished coating as by spraying or soaking. The alcohol portion of such lubricants is of low molecular weight, and is of the double-bond unsaturated type.

U.S. Pat. No. 3,630,772 describes a magnetic memory film having incorporated therein a lubricant of a neutral ester of a 2 to 20 carbon dicarboxylic acid with an aliphatic, monofunctional alcohol having 4 to 18 carbon atoms. Such lubricants are diester molecules. The named lubricants include di-n-butylester of adipic acid, didodecylester of adipic acid, didodecylester of succinic acid, di-n-octylester of sebacic acid, and n-butylester of stearyl acid, the latter being a monoester of stearic acid having a 4 carbon alcohol portion.

U.S. Pat. No. 3,704,152 describes a magnetic recording media and recognizes that esters or amines of fatty acids may be added to magnetic layers as lubricants. Stearyl stearate (18 alcohol, 18 acid) is mentioned. Predominately branched fatty acids containing at least 95% by weight of fatty acid having 12 to 18 carbon atoms and at least 40% by weight of branched fatty acids having 18 carbon atoms is suggested as an improved lubricant. Preferred lubricant is methylated fatty acids such as isostearic acid.

U.S. Pat. No. 3,929,659 discloses magnetic recording media with lubricants of low carbon, branched alcohol and 14 carbon acid such as isobutyl myristate, isopropyl myristate, olive oil and stearamide.

Tridecyl stearate in an aqueous mixture with mineral oil has been suggested as a lubricant for extruding nylon fibers (Chemical Abstracts, 1976, volume 84, page 45992), and for various plastic sheets (Chemical Abstracts, 1965, volume 62, page 6650). U.S. Pat. No. 3,834,870 describes the use of tridecyl stearate in the coning of polypropylene yarn to improve color fastness.

An exemplary teaching of lubricants for $CrO_2$ magnetic recording media is found in U.S. Pat. No. 3,649,541, i.e. lubricants such as amides, alkyl esters, and the metal salts of long-chain fatty acids, hydrocarbyl silicone oils, saturated and unsaturated long-chain hydrocarbons, fluorocarbon telomers, butyl stearate, calcium stearate, stearamide, and squalane.

The foregoing and other features and advantages of the invention will be apparent from the following more particular description of preferred embodiments of the invention, as illustrated in the accompanying drawing.

THE INVENTION

While the above-noted magnetic recording media prior art has recognized the general need for lubricants, and indeed teaches the use of both long and short carbon chain alcohols and stearic acid to form such lubricants, applicants have discovered that unexpected superior results occur when the lubricant comprises a fatty acid ester of 13-carbon tridecyl alcohol and 18-carbon stearic acid, commonly known as tridecyl stearate (TDS). Furthermore, applicants' testing of the lubricating property of magnetic recording media where the alcohol's carbon content of the lubricant is varied both above and below 13-carbon significantly reduces the lubricating property of the media.

Figure 1:
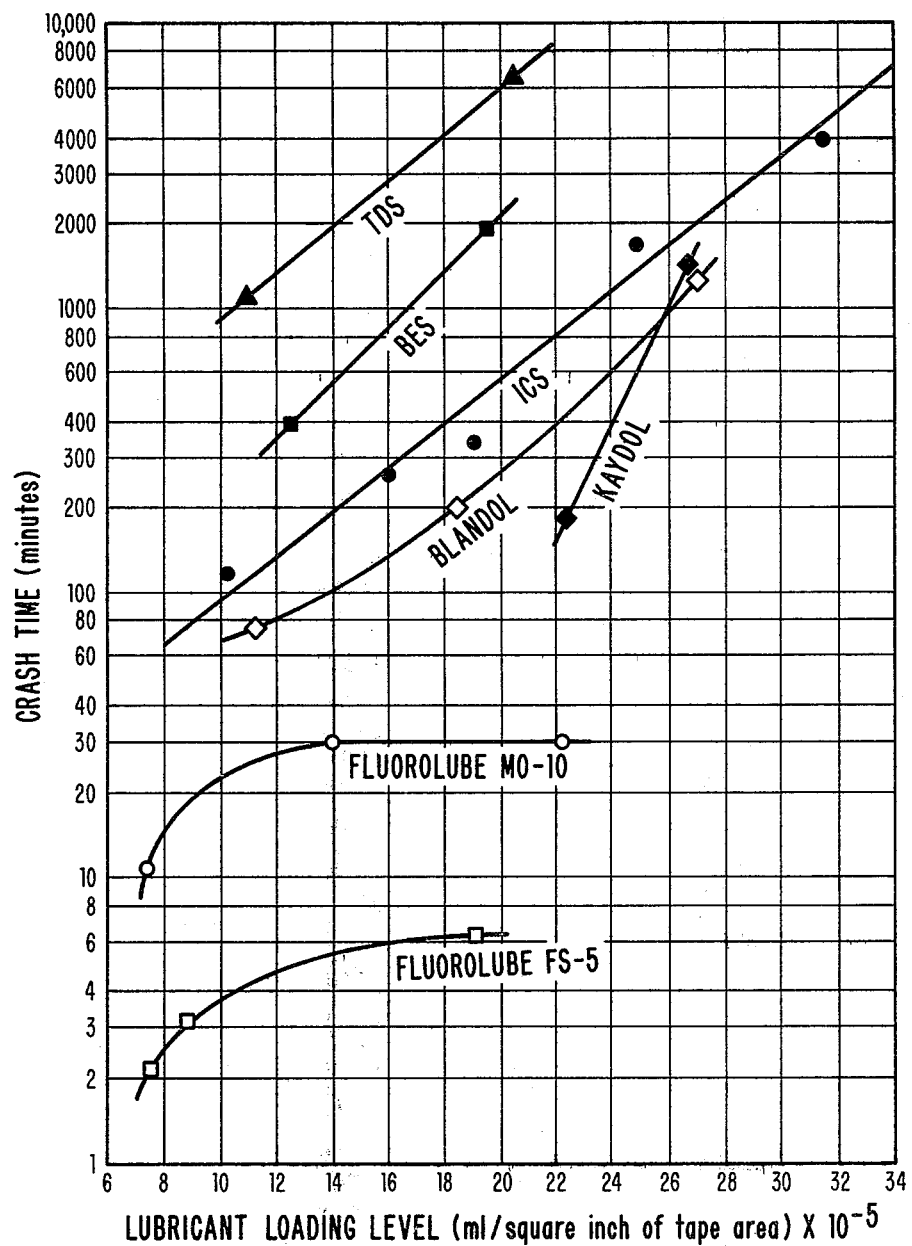
FIG. 1 shows head-crash test results of various lubrication candidates, these candidates being topically applied to commercial iron oxide tape media.

With reference to FIG. 1, the superior results achieved by the topical use of TDS is represented by the semilogrhythmic plotting of the media's lubricant loading level versus crash time; see the curve labeled "TDS". The plot for butoxy ethyl stearate (BES), a 6-carbon alcohol and ether functional group material, shows a significant reduction in lubrication, as does isocetyl stearate (ICS), a stearate whose alcohol constituent is 16-carbon.

Tridecyl stearate is particularly useful as an internal lubricant constituent of such media having $CrO_2$ particles, highly loaded in a binder, and having a very smooth surface for cooperation with a magnetic recording transducer or head.

As used herein, tridecyl stearate is intended to mean commercially available tridecyl stearate which can be purchased from a number of vendors known to those of skill in the art. This commercially available product is essentially tridecyl stearate, i.e. from 70 to 50% tridecyl stearate and from 30 to 50% tridecyl palmitate. An exemplary product of this type can be obtained as "lubricant B109" from Inolex Chemical Division of Wilson Pharmaceutical Company.

While the present invention finds utility in other than chromium dioxide magnetic media, such as gamma iron oxide, it is of particular utility with chromium dioxide media due to the abrasive nature of chromium dioxide particles. As a result of $CrO_2$'s sharp, hard and abrasive action, it is desirable to form such magnetic media with a very smooth recording surface, so as not to wear the relatively hard magnetic head which must cooperate with the recording surface in microinch proximity. However, it has been found that very smooth media results in wear of the relatively soft media recording layer. The use of the TDS lubricant, when incorporated in a very smooth-surface $CrO_2$ magnetic recording media, in actual operation, results in very little wear of either the hard surface of the head or the media's soft recording layer. This advantage is also found in $\gamma Fe_2O_3$ media.

Any of a number of well known methods may be used to prepare magnetic recording media in accordance with the present invention. As an example of magnetic recording media ink formulation and casting methods and techniques well known to those in the art, reference can be had to U.S. Pat. No. 3,649,541, incorporated herein by reference to show the background of the present invention and the state of the art to which the present invention is addressed. As another example, the apparatus of copending application of D. J. Pipkin, Ser. No. 053,143, filed June 27, 1979, commonly assigned and incorporated herein by reference, may be used to coat magnetic ink onto a non-magnetic, flexible substrate to form the tape media of the present invention.

Two specific examples of chromium dioxide magnetic recording media of the flexible, ½ inch tape type, and one example of gamma iron oxide, which have been formulated in accordance with the present invention are given below:

EXAMPLE I

| Material | Function | Wt. % (Solids) | Vol. % (Solids) |
|---|---|---|---|
| Chromium Dioxide | Magnetic Pigment | 79.52 | 50.00 |
| Estane-5703 | Polymeric Binder | 11.69 | 28.80 |
| Saran-F130 | Polymeric Binder | 4.48 | 8.28 |
| Mondur-MRS | Crosslinker | 1.12 | 2.64 |
| Tridecyl Stearate | Lubricant | 1.71 | 5.91 |
| Yelkin-TS | Pigment Dispersant | 1.48 | 4.37 |
| | | 100% | 100% |

In Example I, the chromium dioxide was stabilized, video grade, of the $H_c$ 470–510 grade (E. I. duPont de Nemours & Co.).

Estane 5703 and Estane 5701 are brands (B. F. Goodrich Chemical Co.) of thermoplastic, linear polyester type polyurethane material made by reacting p,p'-diphenylmethane diisocyanate, adipic acid and 1,4-butane diol. Saran-F130 is an 80/20 wt. ratio copolymer of vinylidene chloride and acrylonitrile. Saran is a generic term for a polyvinylidene chloride thermoplastic resin. Mondur-MRS is a brand (Mobay Chemical Co.) of polymethylene polyphenyl isocyanate. Yelkin-TS is a brand (Ross & Rowe, Inc.) of soybean lecithin, which is a mixture of oleic, stearic and palmitic acids, combined with the choline ester of phosphoric acid. Duomeen TDO is a brand of N-alkyltrimethylenediamines by Armour Industrial Chemical Company.

EXAMPLE II

| Material | Function | Wt. % (Solids) | Vol. % (Solids) |
|---|---|---|---|
| Chromium Dioxide | Magnetic Pigment | 80.33 | 50.00 |
| Estane-5701 | Polymeric Binder | 14.59 | 35.34 |
| Mondur-MRS | Crosslinker | 1.02 | 2.38 |
| Tridecyl Stearate | Lubricant | 1.65 | 5.61 |
| Yelkin-TS | Pigment Dispersant | 2.41 | 6.67 |
| | | 100% | 100% |

An example of $\gamma Fe_2O_3$ magnetic recording media of the flexible, one-half inch tape type which has been formulated in accordance with the present invention is given below:

EXAMPLE III

| Material | Function | Wt. % (Solids) | Vol. % (Solids) |
|---|---|---|---|
| γ-Ferric Oxide | Magnetic Pigment | 80.33 | 50.00 |
| Estane-5701 F1 | Polymeric Binder | 14.59 | 35.34 |
| Mondur-MRS | Crosslinker | 1.02 | 2.38 |
| Tridecyl | Lubricant | 1.65 | 5.61 |

| Material | Function | Wt. % (Solids) | Vol. % (Solids) |
|---|---|---|---|
| Stearate | | | |
| Duomeen TDO | Pigment Dispersant | 2.41 | 6.67 |
| | | 100% | 100% |

The chromium dioxide of Example II was the same as that above identified for Example I.

In these three examples, the solid constituents were coated onto a thin, flexible, nonmagnetic backing material, while in the form of a fluid magnetic ink. The resulting product was then heated, to drive off the ink's solvents, calendered and then cured, to form a dry magnetic coating which firmly adhered to the backing material, all as is well known to those of skill in the art. An exemplary backing material is Mylar brand (E. I. duPont de Nemours & Co.) polyester film. The solvents used to form the ink were THF and MIBK, in a 3/1 wt. ratio. In Example I, the solids comprised 39% by weight of the ink, whereas in Example II, the solids comprised 33% by weight of the ink. In example III, the solids comprised 32% by weight of the ink.

The procedures for formulating a magnetic ink and for coating the ink onto an appropriate substrate in accordance with the above examples of the present invention are considered to be well known to those of skill in the art, and are not critical to the practice of the present invention; thus, such ink formulation procedures and coating procedures will not be described herein.

The search for a superior lubricant for magnetic recording media which resulted in the present invention began by testing a number of candidates (see FIG. 1), each of which was topically applied to flexible, iron oxide magnetic recording tape media of known characteristics. This topically lubricated tape was then tested in a rotating head device of known characteristics, with a section of tape held stationary as the head rotated. By using a known media and a known transducing device, test result variations are attributable only to the particular lubrication candidate then under test.

This testing resulted in TDS being identified as a suprisingly superior lubricant. The next series of tests involved the exploration of TDS's lubrication characteristics in the more difficult lubricating environment of $CrO_2$ magnetic recording tape, with a view to determining if here again TDS was a superior lubricant. The $CrO_2$ tape under test was again held stationary as it was transduced by a rotating head. In this case, TDS was dispersed within the composition of the magnetic recording layer, rather than being topically applied thereto. The superior lubricating properties of TDS were also found to exist in this test.

As stated, the first step to improving the lubrication characteristic of magnetic recording media, while of course retaining a high signal to noise ratio, was that of topically applying candidate materials to media of known properties, and then transducing a stationary length of such coated media with a rotating head transducer of known properties.

Since the linear bit density of the magnetic media's recorded digital signals, and the resolution of these signals, increases with decreased head-to-media spacing, close proximity of the head to the magnetic media was essential. However, as this "flying height" becomes smaller, the likelihood of contact between head and media surface increases. In other words, the load-bearing air film between the head and media becomes thinner and more difficult to maintain. Hence, operation in the boundary lubrication mode should occur a greater percentage of the time. Boundary lubrication encompasses a major portion of lubrication phenomena, excluding only the sliding and seizing of clean surfaces, and full fluid film hydrodynamic lubrication.

The objective of this first test was to select the best boundary lubricant to be later incorporated into flexible magnetic recording media for rotating head devices. After a literature search, a relatively small number of candidates for functional testing were chosen. These materials are listed in Table I. They all possessed the favorable chemical and physical properties presented in Table II.

TABLE I

Candidates Chosen for Functional Testing

| | Name | Viscosity (measured at 25° C.) Centipoise | |
|---|---|---|---|
| 1. | Isocetyl Stearate (ICS) | 27.4 | fatty esters |
| 2. | Tridecyl Stearate (TDS) | 22.1 | |
| 3. | Butoxyethyl Stearate (BES) | 11.0 | |
| 4. | Blandol brand (Witco Chemical Co., Inc.) | 23.3 | saturated aliphatic and naphthenic hydrocarbons |
| 5. | Kaydol | 135.6 | |
| 6. | Fluorolube FS-5 | 26.1 | polychlorotifluoroethylenes |
| 7. | Fluorolube MO-10 | 41.2 | |

TABLE II

| Characteristics of a Good Media Lubricant |
|---|
| Low evaporation rate |
| High purity |
| Migrates readily |
| Optimum viscosity |
| Constant viscosity with changing temperature |
| Very stable at high temperature and high humidity |
| Compatible with media solvents |

These seven lubricants were then tested to evaluate their performance in a rotating head device. By means of a simple two-step process, each lubricant was applied to the recording surface of 2.7 inches wide iron oxide tape which contained no other lubricant. Each tape sample was 23 inches long. The lubricant was sprayed onto the tape's surface from an air gun using Freon TF as the carrier solvent. The concentration of dissolved lubricant was about 5 to 8%. After spraying, the media surface was buffed to spread out the droplets of lubricant onto a continuous film. The lubricant loading level (FIG. 1) could be varied, with the tape stationary, and was determined by measuring the tape's weight gain.

Each lubricated tape sample was then manually loaded onto a rotating head robot and run in a dwell-only mode (i.e., stationary tape) until a head crash occurred. A crash event was defined as the time necessary for the rotating head's signal output to degrade to 70% of its magnitude at the start of test. These crash tests were carried out at ambient temperature and relative humidity.

The results of these first head-crash screening tests are given in Table III and in FIG. 1. In FIG. 1 the volume of lubricant is expressed as milliliters per square inch of tape area $\times 10^{-5}$. In Table III, the volume of lubricant is expressed in ml on a 2.7″ by 23″ tape area media sample. The crash time is given in minutes.

TABLE III

Head Crash Tests

| Lubricant | Density (measured at 25° C.) gm/ml | Weight of Lubricant on 2.7" × 23" Sample Media mg | Volume of Lubricant on 2.7" × 23" Sample Media ml | Average Crash Time (at ambient temp. and relative humidity) minutes |
|---|---|---|---|---|
| ICS | 0.85 | 5.3 | 0.00619 | 118 |
| | | 8.4 | 0.00981 | 273 |
| | | 10.0 | 0.01168 | 350 |
| | | 13.2 | 0.01542 | 1784 |
| | | 16.8 | 0.01963 | 4126 |
| TDS | 0.86 | 5.6 | 0.00651 | 1104 |
| | | 10.8 | 0.01256 | 6300 |
| BES | 0.88 | 6.7 | 0.00761 | 392 |
| | | 10.5 | 0.01193 | 1900 |
| Blandol | 0.84 | 5.8 | 0.00690 | 75 |
| | | 9.5 | 0.01131 | 208 |
| | | 14.1 | 0.01679 | 1312 |
| Kaydol | 0.87 | 12.2 | 0.01402 | 187 |
| | | 14.5 | 0.01664 | 1430 |
| Fluorolube FS-5 | 1.89 | 8.5 | 0.00450 | 2 |
| | | 10.0 | 0.00529 | 3 |
| | | 22.2 | 0.01175 | 6 |
| Fluorolube MO-10 | 1.90 | 5.9 | 0.00311 | 6 |
| | | 16.2 | 0.00853 | 29 |
| | | 26.0 | 0.01368 | 30 |

Several conclusions can be drawn from an examination of these results. First, crash time increases with increased lubricant volume level for all seven candidates. (The recording surface of all tape samples was dry prior to testing.) Second, the fatty esters performed the best while the polychlorotrifluoroethylenes are least desirable. Third, each chemical type seemed to group together with respect to crash performance. Fourth, the performance of tridecyl stearate is an order of magnitude better than that of isocetyl stearate.

The above technique of surface lubrication combined with functional testing produced usable test results within a reasonable time period, and the results allowed selection of a superior lubricant, TDS, which was then incorporated into the $CrO_2$ media of Examples I and II for use on rotating head devices.

The above-described tests clearly identified TDS as a lubricant candidate which justified further investigation in a more stringent $CrO_2$ media environment. The $CrO_2$ magnetic recording media of foregoing Examples I and II were formulated in order to perform tests 1–9 and 12 whose results are given in the following Table IV. The media of tests 10 and 11 was that of Example I where ICS (isocetyl stearate) was substituted for TDS. ICS is a stearate whose alcohol constituent is 16-carbon, whereas TDS's alcohol constituent is 13-carbon. Tests 13 and 14 were conducted with a commercial grade $CrO_2$ magnetic recording media known by the trade name "Crolyn".

In Table IV the surface smoothness gloss number was obtained by the use of an instrument known as the Gardner Glossmeter, whereas the number listed in association with the gloss number was the microscopically observed peak-to-value roughness expressed in $\mu$ inches. The time-to-crash parameter (with a longer time being a measure of better lubrication) was the time period necessary for the signal transduced or read by the rotating head from the stationary tape to degrade to 70% of its magnitude at the beginning of the time period. Tests 13 and 14 were conducted with a commercial grade $CrO_2$ tape sold by E. I. duPont de Nemours & Co. under the trade name Crolyn. A well known solvent extraction process provided identification of its lubrication constituent to be butyl stearate and/or stearamide.

TABLE IV

| Test | Media Type | Surface Smoothness | Lubricant | Time to Crash |
|---|---|---|---|---|
| 1. | Example I | Gloss = 111(4.5) | TDS | >24.0 hours |
| 2. | Example I | Gloss = 111(4.5) | TDS | 19.3 hours |
| 3. | Example I | Gloss = 111(4.5) | TDS | 11.3 hours |
| 4. | Example I | Gloss = 111(4.5) | TDS | >48.0 hours |
| 5. | Example I | Gloss = 111(4.5) | TDS | >23.9 hours |
| 6. | Example I | Gloss = 107(4.03) | TDS | 4.7 hours |
| 7. | Example I | Gloss = 107(4.03) | TDS | 6.8 hours |
| 8. | Example I | — | TDS | >24.0 hours |
| 9. | Example I | — | TDS | >24.2 hours |
| 10. | Example I | Gloss = 110(4.2) | ICS | 0.2 hours |
| 11. | Example I | Gloss = 110(4.2) | ICS | 0.2 hours |
| 12. | Example II | Gloss = 112(5.0) | TDS | >24.0 hours |
| 13. | Crolyn | Gloss = 100 | Stearamide / Butyl Stearate | 1.8 hours |
| 14. | Crolyn | Gloss = 100 | Stearamide / Butyl Stearate | 0.7 hours |

From Table IV it can be seen that the present invention, Examples I and II used in tests 1–9 and 12, gives time-to-crash measures of goodness varying from 4.7 hours (test 6) to greater than 48 hours (test 4). In tests 10 and 11 the use of ICS (a material whose alcohol carbon content is 16) as the media's lubrication constituent yielded markedly poorer results of 0.2 hour. The selected commercially available grade $CrO_2$ magnetic recording media of tests 13 and 14 performed better than did the media of tests 10 and 11. However, even the poorest of the present invention media (test 6) was markedly better than the media of tests 13 and 14, thus testifying to the synergistic nature of the present invention.

Another test of a magnetic recording media's lubricant constituent is the ability of that constituent to reduce mechanical wearing of a transducing head or a ferrite rod.

In order to test Examples I and II of the present invention in these environments, the media of Example I was compared to the commercially available $CrO_2$ media of tests 13 and 14 and to commercial iron oxide media, in a rotating head environment, and the media of Example II was compared to the media of tests 13 and 14 in a rod-wear environment.

Figure 2:
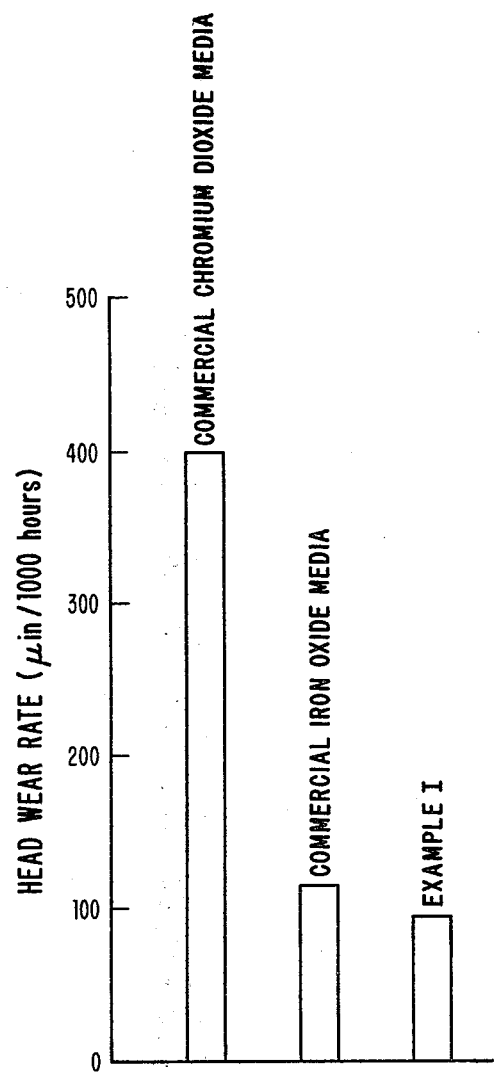
FIG. 2 shows the results of rod wear tests using commercial $CrO_2$ media, commercial iron oxide media, and Example I media in accordance with the present invention.

FIG. 2 shows the results of the first test, wherein the wear rate of the head of a commercial rotating head tape transport is given in micro inches for each 1,000 hours of operation for the CrO2 tape of tests 13, 14; for a commercial iron oxide tape media; and for tape media in accordance with Example I. During this test, the head rotated at a constant speed and each of the tapes moved in step fashion just as they would during data processing on the commercial rotating head tape transport. As was expected, the conventional CrO2 media of tests 13, 14 produced greater head wear than did the conventional iron oxide media. Unexpectedly, and as evidence of the synergistic effect of the formulation of Example I, the Example I media produced less head wear than the iron oxide media.

Table V shows the results of the second test, wherein the equivalent of $960 \times 10^3$ feet of the two test media, i.e. the media of tests 13, 14, and the media of Example II were padded over five different, stationary ferrite rods of the type listed. All rods were of a two-inch diameter. The resulting rod wear was measured in micro inches. The tape speed was held the same constant speed for each media and each rod. The 13, 14 media was 0.001 inch thick, whereas the Example II media was 0.0015 inch thick. This greater thickness of Example II media would be expected to produce much greater rod wear, all other factors being held constant. However, the superiority of the present invention as exemplified by Example II produced performance superior to the test 13, 14 media.

TABLE V

Rod Wear Test

| Ferrite Rod | Average Depth of Rod Wear in Micro Inches | |
|---|---|---|
| | Test 13, 14 Media | Example II |
| NZ4T | 84 | 57 |
| NZ4A | 59 | 57 |
| NZ4 | 48 | 41 |
| NZ13 | 39 | 43 |
| National Micronetrics | | |
| LM-20 | 33 | 23 |
| LM-5K | 76 | 69 |

In summary, testing of TDS topically applied to iron oxide recording media, and internally dispersed in chromium dioxide and iron oxide recording media has shown this lubricant to have surprisingly superior lubrication qualities, and provides the ability to use chromium dioxide media in situations where excessive wear to the tape or the head would be experienced but for the present invention.

While a preferred embodiment of the invention has been described, it is to be understood that the present invention is not limited to this precise disclosure, and that the invention is defined by the scope of the appended claims.

What is claimed is:

1. Magnetic recording media comprising a base substrate having a magnetic recording layer thereon, said layer consisting of finely divided magnetic particles dispersed in a binder and including a lubricant having essentially the composition

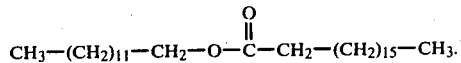

2. The magnetic recording media of claim 1 wherein said magnetic particles comprise $\gamma Fe_2O_3$.

3. The magnetic recording media of claim 1 wherein said magnetic particles comprise $CrO_2$.

4. Flexible magnetic recording media comprising a flexible substrate, a magnetic recording layer on said substrate, said layer having chromium dioxide magnetic particles dispersed in a urethane-based binder matrix, and including tridecyl stearate lubricant.

5. The magnetic recording media defined in claim 4 wherein the percent by volume of chromium dioxide is about 50%, the percent by volume of tridecyl stearate is about 6%, and the remainder being said binder matrix.

6. Flexible magnetic recording media comprising a flexible substrate, a magnetic recording layer on said substrate, said layer having gamma iron oxide magnetic particles dispersed in a urethane-based binder matrix, and including tridecyl stearate lubricant.

7. The magnetic recording media defined in claim 6 wherein the percent by volume of gamma iron oxide is about 50%, the percent by volume of tridecyl stearate is about 6%, and the remainder being said binder matrix.

* * * * *